(12) United States Patent
Takeda (10) Patent No.: US 11,880,059 B2
(45) Date of Patent: Jan. 23, 2024

(54) BACKLIGHT INCLUDING REFLECTIVE POLARIZER AND DIFFUSE REFLECTIVE FILM ASSEMBLY FOR UNIFORM ILLUMINATION

(71) Applicant: 3M INNOVATIVE PROPERTIES COMPANY, St. Paul, MN (US)

(72) Inventor: Yasuyuki Takeda, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 31 days.

(21) Appl. No.: 17/632,311

(22) PCT Filed: Aug. 26, 2020

(86) PCT No.: PCT/IB2020/057969
§ 371 (c)(1),
(2) Date: Feb. 2, 2022

(87) PCT Pub. No.: WO2021/044257
PCT Pub. Date: Mar. 11, 2021

(65) Prior Publication Data
US 2022/0299698 A1  Sep. 22, 2022

(30) Foreign Application Priority Data
Sep. 6, 2019 (CN) .......................... 201921478725.6

(51) Int. Cl.
*F21V 8/00* (2006.01)
*G02F 1/13357* (2006.01)
*G02F 1/1335* (2006.01)

(52) U.S. Cl.
CPC ......... *G02B 6/0055* (2013.01); *G02B 6/0031* (2013.01); *G02B 6/0051* (2013.01);
(Continued)

(58) Field of Classification Search
CPC ................ G02B 6/0031; G02B 6/0055; G02F 1/133536; G02F 1/133553
See application file for complete search history.

(56) References Cited

U.S. PATENT DOCUMENTS 5,882,774 A   3/1999   Jonza
2008/0080055 A1   4/2008   Lightfoot
(Continued)

FOREIGN PATENT DOCUMENTS

CN   210109367   2/2020
EP   2466349   6/2012
(Continued)

OTHER PUBLICATIONS

International Search Report for PCT International Application No. PCT/IB2020/057969, dated Nov. 2, 2020, 3 pages.

*Primary Examiner* — Keith G. Delahoussaye
(74) *Attorney, Agent, or Firm* — Clifton F. Richardson; Robert S. Moshrefzadeh (57) ABSTRACT

A backlight for providing illumination to a liquid crystal panel includes a reflective polarizer and an extended light source. The extended light source includes a diffuse reflective film assembly and an emission surface disposed between the reflective polarizer and the diffuse reflective film assembly. The extended light source is configured to emit light through the emission surface toward the reflective polarizer. The diffuse reflective film assembly includes a specularly reflective film and an optically diffusive film disposed between the emission surface and the specularly reflective film. The optically diffusive film is bonded to the specularly reflective film at a plurality of discrete spaced apart bonded locations with a total bonding area of less than about 20%.

20 Claims, 3 Drawing Sheets

(52) U.S. Cl.
CPC ..... *G02B 6/0088* (2013.01); *G02F 1/133504* (2013.01); *G02F 1/133536* (2013.01); *G02F 1/133553* (2013.01); *G02F 1/133615* (2013.01); *G02B 6/0068* (2013.01)

(56) References Cited

U.S. PATENT DOCUMENTS

| | | | | |
|---|---|---|---|---|
| 2010/0014164 A1* | 1/2010 | O'Brien | ............... | G02B 6/0055 264/2.7 |
| 2010/0067257 A1* | 3/2010 | Meis | .................... | G02B 6/0055 362/624 |
| 2013/0222732 A1* | 8/2013 | O'Neill | ............... | G02B 6/0055 349/62 |

FOREIGN PATENT DOCUMENTS

| | | |
|---|---|---|
| JP | 2002022910 | 1/2002 |
| JP | 2002148415 | 5/2002 |
| WO | WO 1997-001774 | 1/1997 |
| WO | WO 2008-042169 | 4/2008 |
| WO | WO 2015-066017 | 5/2015 |
| WO | WO 2016-072472 | 5/2016 |

* cited by examiner

FIG. 6

BACKLIGHT INCLUDING REFLECTIVE POLARIZER AND DIFFUSE REFLECTIVE FILM ASSEMBLY FOR UNIFORM ILLUMINATION

TECHNICAL FIELD

The disclosure generally relates to backlit illumination systems, specifically to a backlight for providing uniform illumination to a display panel.

BACKGROUND

Flat panel displays are used in a variety of applications ranging from relatively large devices including computer monitors and televisions, to small, handheld devices such as cell telephones, portable DVD players, wristwatches, gaming devices, and other applications. A widely-used type of display is the liquid crystal display (LCD). Because LCDs do not create light themselves, they require a source of illumination—either reflected ambient light, or more commonly, light from a backlight. The backlight generally includes an illumination device, which may include light sources such as light emitting diodes or fluorescent lamps, and a number of light management films between the illumination device and the LCD panel. In general, the light management films enhance the operation of a display by promoting more efficient and effective use of light.

SUMMARY

In some aspects of the disclosure, a backlight for providing illumination to a liquid crystal panel is provided. The backlight includes a reflective polarizer. For a substantially normally incident light and for at least one visible wavelength in a range extending from about 400 nm to about 800 nm, the reflective polarizer reflects at least 60% of the incident light having a first polarization state and transmits at least 60% of the incident light having an orthogonal second polarization state. The backlight further includes an extended light source. The extended light source includes a diffuse reflective film assembly and an emission surface disposed between the reflective polarizer and the diffuse reflective film assembly. The extended light source is configured to emit light through the emission surface toward the reflective polarizer. The diffuse reflective film assembly includes a specularly reflective film. For a substantially normally incident light and for the at least one visible wavelength, the reflective film specularly reflects at least 80% of the incident light for each of the first and second polarization states. The diffuse reflective film assembly further includes an optically diffusive film disposed between the emission surface and the specularly reflective film. The optically diffusive film is bonded to the specularly reflective film at a plurality of discrete spaced apart bonded locations.

Other aspects of the disclosure relate to an optically diffuse reflective film assembly. The optically diffuse reflective film assembly includes a specularly reflective film. For a substantially normally incident light and for at least one visible wavelength in a wavelength range extending from about 400 nm to about 800 nm, the reflective film specularly reflects at least 95% of the incident light for each of orthogonal first and second polarization states. The optically diffuse reflective film assembly further includes an optically diffusive film bonded to the specularly reflective film. The bonding pattern includes a plurality of spaced apart bonding areas with a total bonding area of less than about 20%. The optically diffusive film includes a plurality of fibers dispersed in a material. At least 20% of the fibers have an average diameter less than about 5 microns. At least 50% of the fibers have an average diameter greater than about 8 microns.

Other aspects of the disclosure relate to display systems including a liquid crystal panel disposed on a backlight.

BRIEF DESCRIPTION OF DRAWINGS

The various aspects of the disclosure will be discussed in greater detail with reference to the accompanying figures where, FIG. 1 schematically illustrates a display system having a backlight for providing illumination to a display panel according to some embodiments of the disclosure.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Display panels, such as, for instance, Liquid Crystal Displays (LCD), often utilize a backlight arrangement that is desired to be efficient and spatially, angularly, and spectrally uniform. Backlighting technique is an effective means to provide a wide range of brightness for independent regions of the display and improves the user visual experience. One method of backlit illumination utilizes discrete light sources such as LEDs and a lightguide to spread the light uniformly over the area of the display. Backlighting methods generally utilize additional optics to achieve the uniformity and brightness specifications. As LCD size becomes larger and thinner, as desired in many applications, reflective films tend to warp or become distorted due to various reasons. Such warping may create mura defects, which may appear as low contrast, non-uniform brightness regions. Embodiments described herein address these and other challenges to enhance luminance and reduce, or eliminate, brightness mura caused by waving or warping of the reflective film.

Figure 1:
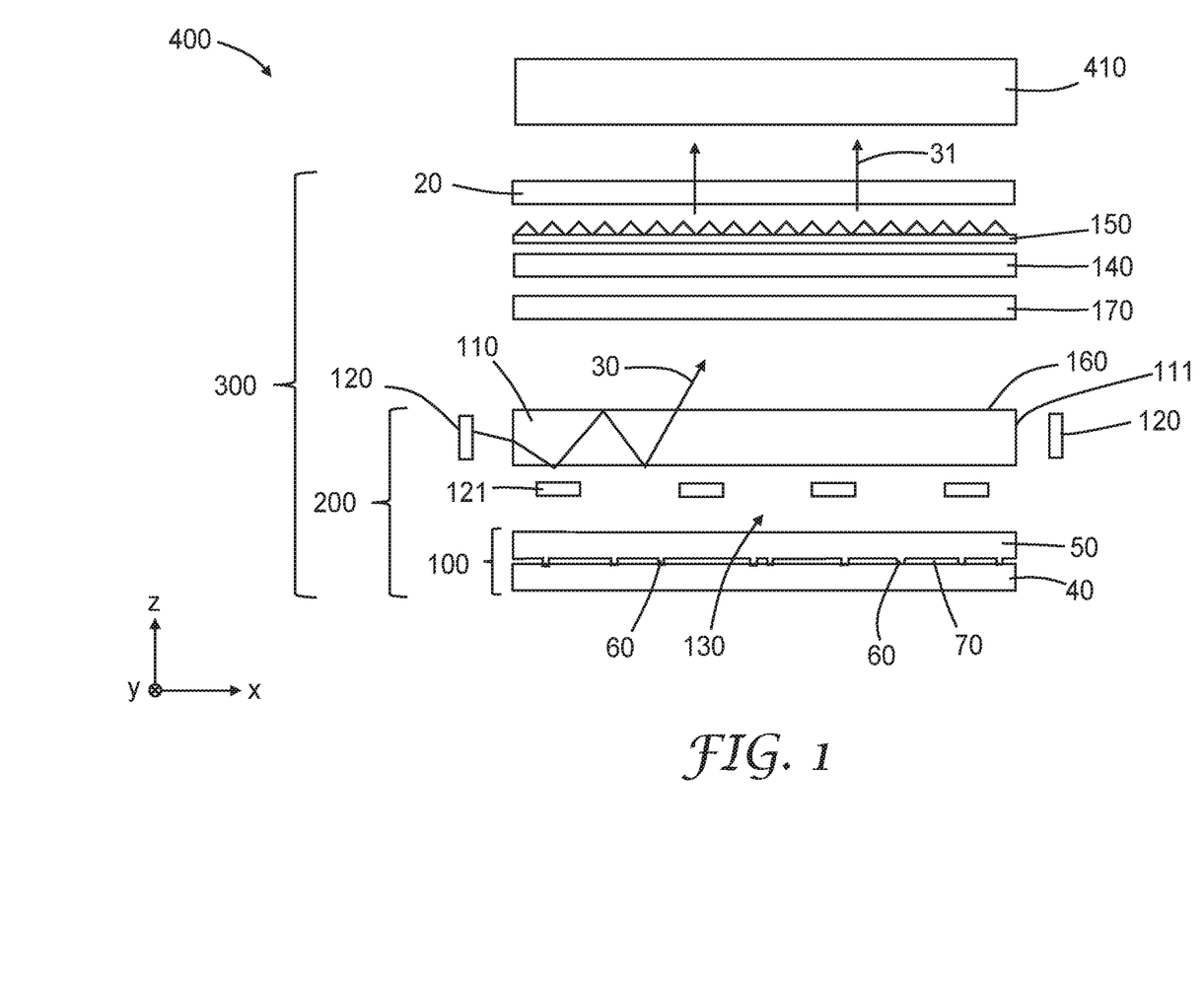

Referring to FIG. 1, a display system (400) includes a liquid crystal panel (410) disposed on a backlight (300), which provides illumination (31) to the liquid crystal panel (410). The liquid crystal panel (410) includes a layer of liquid crystals disposed between panel plates. The panel plates are often formed of glass, and may include electrode structures and alignment layers on their inner surfaces for controlling the orientation of the liquid crystals in the liquid crystal layer.

The backlight (300) includes a reflective polarizer (20) and an extended light source (200). The extended light source (200) may include a planar light guide with an extended output surface that emits white light. At least some of the light reflected by the reflective polarizer (20) may be depolarized, and subsequently returned to the reflective polarizer (20) in a polarization state that is transmitted through the reflective polarizer (20) to the liquid crystal panel (410). In this manner, the reflective polarizer (20) may be used to increase the fraction of light emitted by the extended light source (200) that reaches the liquid crystal panel (410), and so the image produced by the display system (400) is brighter.

The reflective polarizer (20) substantially reflects light having one of orthogonal first and second polarization states (e.g., a first polarization state with the electric field along the x-axis) and substantially transmits light having the other of the first and second polarization states (e.g., a second polarization state with the electric field along the y-axis) for at least one visible wavelength in a range. In some embodiments, for a substantially normally incident light, and for at least one visible wavelength in a range extending from about 400 nm to about 800 nm, the reflective polarizer (20) may be said to substantially reflect light having a first polarization state if at least 60% of incident light having the first polarization state is reflected through the polarizer (20). In some embodiments, at least 70%, or at least 80%, of incident light having the first polarization state is reflected through the polarizer (20). In some embodiments, for a substantially normally incident light, and for at least one visible wavelength in a range extending from about 400 nm to about 800 nm, the reflective polarizer (20) may be said to substantially transmit light having an orthogonal second polarization state if at least 60% of incident light having the orthogonal second polarization state is transmitted from the reflective polarizer (20). In some embodiments, at least 70%, or at least 80%, of incident light having the orthogonal second polarization state is transmitted from the reflective polarizer (20).

In some aspects, the at least one visible wavelength includes each visible wavelength in a range from about 400 nm to about 800 nm.

The reflective polarizer (20) used in the optical systems of the present description may be any suitable type of reflective polarizer. The reflective polarizer may be a multilayer optical film (MOF) that may be substantially uniaxially oriented as described further elsewhere. Substantially uniaxially oriented reflective polarizers are available from 3M Company under the trade designation Advanced Polarizing Film 5 or APF. Other types of multilayer optical film reflective polarizers (e.g., Dual Brightness Enhancement Film or DBEF available from 3M Company) may also be used, which have low reflectivity for light polarized with component along one in-plane axis, and high reflectivity for light polarized with component along the second, orthogonal in-plane axis. In some embodiments, other types of reflective polarizers, such as, continuous/disperse phase polarizers, wire grid reflective polarizers, or cholesteric reflective polarizers are used. Cholesteric polarizers are often provided along with a quarter wave retarding layer on the output side, so that the light transmitted through the cholesteric polarizer is converted to linear polarization.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774 (Jonza et al.), incorporated herein by reference. Commercially available examples of MOF reflective polarizers include Vikuiti™ DBEF-D200 and DBEF-D440 multilayer reflective polarizers that include diffusive surfaces, and DBEF-Q that includes relatively thick (5 or 10 mil (125 μm or 250 μm)) skin layers of polycarbonate, available from 3M Company, St. Paul, Minn.

In some embodiments, the extended light source includes a diffuse reflective film assembly (100) and an emission surface (160). The diffuse reflective film assembly (100) and the emission surface (160) may be substantially aligned and co-extensive with each other. The emission surface (160) is disposed between the reflective polarizer (20) and the diffuse reflective film assembly (100). The extended light source (200) is configured to emit light (30) through the emission surface (160) toward the reflective polarizer (20). In some aspects, the extended light source (200) includes a lightguide (110) for propagating light (30) therein along a length (x-axis) and a width (y-axis) of the lightguide. The lightguide (110) includes the emission surface (160) and is disposed between the emission surface (160) and the diffuse reflective film assembly (100). At least one light source (120) is disposed proximate an edge surface (111) of the lightguide (110). The at least one light source (120) may be any device capable of emitting light such as, e.g., light emitting diodes, fluorescent lights, noble gas lights, incandescent lights, etc. In the illustrated embodiment shown in FIG. 1, at least one exemplary lightguide (110) may be described as being a side-emitting lightguide that is configured to receive light from light sources (120) located on either end of the lightguide (110) and redirect, or reflect, the received light (30) along one or more sides of the lightguide (110) along at least a portion of the length of the lightguide (110) (e.g., a plurality of portions of the length, the entire length, etc.).

In some other aspects, the emission surface (160) and the diffuse reflective film assembly (100) define an optical cavity (130) therebetween. At least one light source (121) may be disposed in the optical cavity (130). In some embodiments, a plurality of light sources, for example, LEDs, may be disposed in the optical cavity (130), say along the length (x-axis) of the cavity (130).

In some embodiments, the diffuse reflective film assembly (100) includes a specularly reflective film (40) and an optically diffusive film (50) bonded to the specularly reflective film (40). The specularly reflective film (40) and the optically diffusive film (50) may be substantially aligned and co-extensive with each other. A specularly reflective film (40) is a layer for which an incident light ray is reflected such that the reflected angle is substantially equal to the angle of incidence. On a practical basis, all surfaces have some deformation which results in some scattering of the reflected light ray. For instance, ≤10% of the incident light may be reflected at angles not equal to the incident angle. In many instances, there is less than 1% of the light reflected at angles not equal to the incident angle.

In some embodiments, for a substantially normally incident light, and for at least one visible wavelength in a range extending from about 400 nm to about 800 nm, the reflective film (40) may be said to substantially reflect light if at least 80% of incident light for each of the first and second polarization states is specularly reflected by the reflective film (40). In some embodiments, for substantially normally incident light and for the at least one visible wavelength in a range extending from about 400 nm to about 800 nm, the reflective film (40) specularly reflects at least 90%, or at least 95% of the incident light for each of the first and second polarization states. In some embodiments, the specularly reflective film (40) has an average specular reflectance of greater than about 99% in a visible range extending from about 450 nm to about 650 nm.

In some aspects, the at least one visible wavelength includes each visible wavelength in a range from about 400 nm to about 800 nm.

In some instances, the specularly reflective film or layer may be a multilayer polymeric mirror film that reflects at least about 95% of light incident on the film. In some instances, the multilayer polymeric mirror film may reflect at least about 98 percent of all incident light, regardless of incident angle. In many cases, the multilayer polymeric mirror film may be Vikuiti™ ESR, ESR2, ESR-80v2, ESR100, which are available from 3M Company, St. Paul, Minnesota. The specularly reflective film (40), in some instances, may include a plurality of polymeric layers numbering more than about 50, or more than about 70, or more than about 100, in total.

In some aspects, the optically diffusive film (50) is disposed between the emission surface (160) and the specularly reflective film (40). In some embodiments, for a substantially normally incident light and for at least one visible wavelength in a range extending from about 400 nm to about 800 nm, the diffuse reflective film assembly (100) has a total light reflectance greater than about 90% and a specular reflectance of less than about 50%. In some embodiments, the total light reflectance of the diffuse reflective film assembly (100) may be greater than 95%, or greater than 97%, and a specular reflectance may be less than about or less than 40%, or less than 30%, or less than 20%, or less than 10%, for each of the first and second polarization states.

Figure 5:
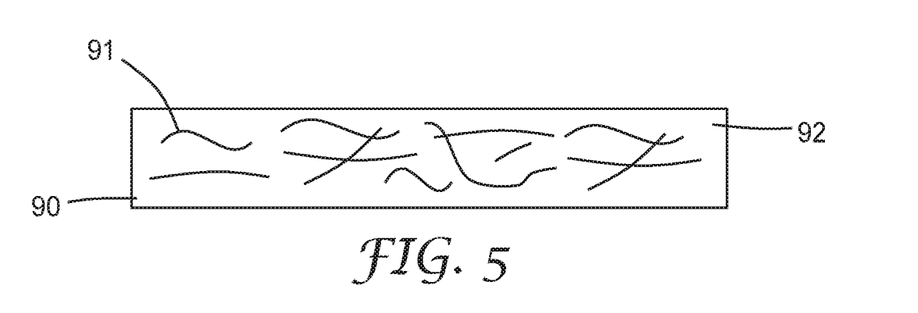
FIG. 5 schematically illustrates the optically diffuse film according to some aspects.

In some embodiments, as schematically shown in FIG. 5, the optically diffusive film (50) includes a plurality of fibers (91). A ratio of a total weight of the fibers to a total weight of the optically diffusive film may be greater than about 80%, or greater than about 85%, or greater than about 90%. In some instances, the plurality of fibers (91) in the optically diffusive film (50) may be dispersed in a material (92).

In other embodiments, the optically diffusive film (50) may include a non-woven layer (90) having a plurality of fibers (91). A ratio of a total weight of the fibers (91) to a total weight of the non-woven layer (90) may be greater than about 50%, or greater than about 70%, or greater than about 90%. In some instances, a ratio of a total weight of the fibers (91) to a total weight of the non-woven layer (90) may be greater than about 95%. In some other embodiments, the plurality of fibers (91) in the non-woven layer (90) may be dispersed in a material (92).

In some instances, the non-woven layer (90) may contain core-sheath fiber. The core-sheath fiber acts as a thermal bonding agent and the non-woven layer (90) can be heat laminated to the specular reflective film (40) with the core-sheath fiber. The content of the core-sheath fiber may be more than 10%.

In some aspects, the fibers (91) have an average diameter less than about 10 microns, or less than 8 microns in some embodiments. In some embodiments, the fibers (91) may be a micro fiber having an average diameter of less than or equal to about 3 microns. Micro fiber enhances diffuse reflection and increases luminance. Micro fiber also reduces the increase of the value color x, and color y of the display system (400). The content of this micro fiber may be more than 20%. In some embodiments, at least 20% of the fibers (91) have an average diameter less than about 5 microns, and at least 50% of the fibers (91) have an average diameter greater than about 8 microns. In other embodiments, at least 70% of the fibers (91) have an average diameter of about 3 microns, and at least 30% of the fibers (91) have an average diameter of about 12 microns.

An optically diffusive layer (170) may be disposed between the extended light source (200) and the reflective polarizer (20), in some aspects, for diffusing light emitted by the extended light source (200). The optically diffusive layer (170) may aid in extracting light, to further condition the output light angle distribution for substantially uniform distribution of light. Optically diffusive layer (170) may be any optically diffusive layer that may be desirable and/or available in an application. For example, the optically diffusive layer can include a plurality of particles, such as a plurality of TiO2 particles, dispersed in a binder where the particles and the binder have different indices of refraction. In some cases, such as when optically diffusive layer (170) is sufficiently diffusive to impart a white look to the display system (400), the optically diffusive layer has an optical haze that is not less than about 40%, or not less than about 50%, or not less than about 60%, or not less than about 70%, or not less than about 80%, or not less than about 90%, or not less than about 95%.

In some other embodiments, one or more prismatic layers (140, 150) may be disposed between the reflective polarizer (20) and the emission surface (160). The reflective polarizer (20), the emission surface (160) of the extended light source, and the one or more prismatic layers (140, 150) may be substantially co-extensive with each other, in some aspects.

Figure 6:
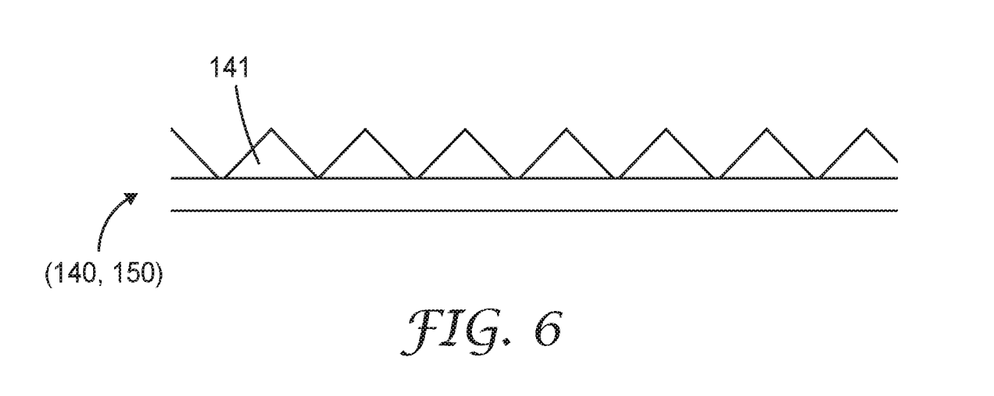
FIG. 6 schematically illustrates a prismatic layer disposed between the reflective polarizer and a light source.

In some instances, the one or more prismatic layers (140, 150) include a plurality of prismatic structures (141) as illustrated in FIG. 6. In some instances, one or more prismatic layers (140, 150) may be placed above the optically diffusive layer (170), either unattached or coupled with each other, with the prism structure facing the extended light source (200). The optically diffusive layer (170) extracts light from the diffuse reflective film assembly (100), while the prismatic layers (140, 150) redirects the angle distribution, and reimages the output from the diffuse reflective film assembly (100) to improve uniformity. Images and conoscopic output that provides maximum brightness and good uniformity may be simulated as a function of an apex angle of the prisms. The apex angle may be around 50°-80° for good uniformity and output angle distributions.

Figure 2:
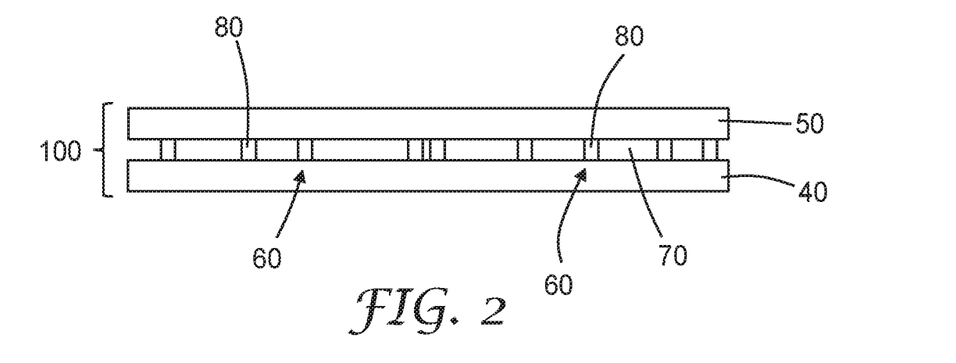
FIGS. 2 and 3 schematically illustrate different views of a diffuse reflective film assembly according to some aspects of the disclosure.
Figure 3:
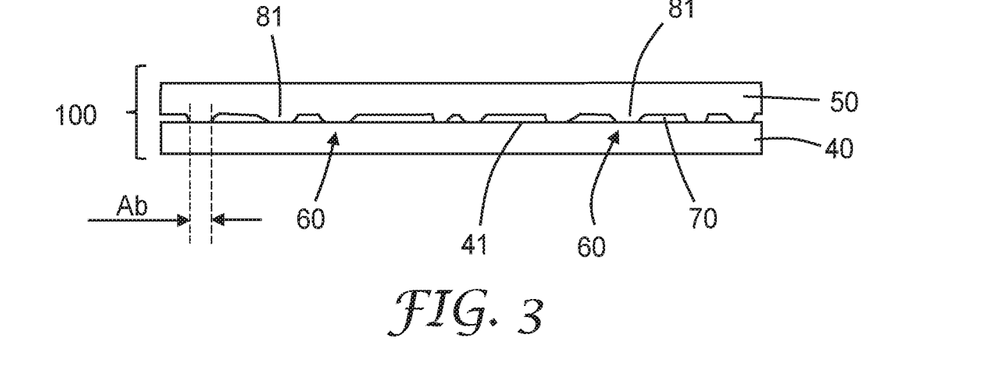
Figure 4A:
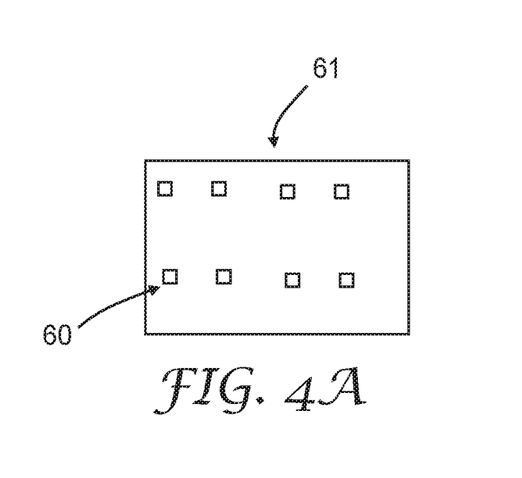
FIGS. 4A and 4B schematically illustrate different bonding locations between the optically diffusive film and the specularly reflective film.
Figure 4B:
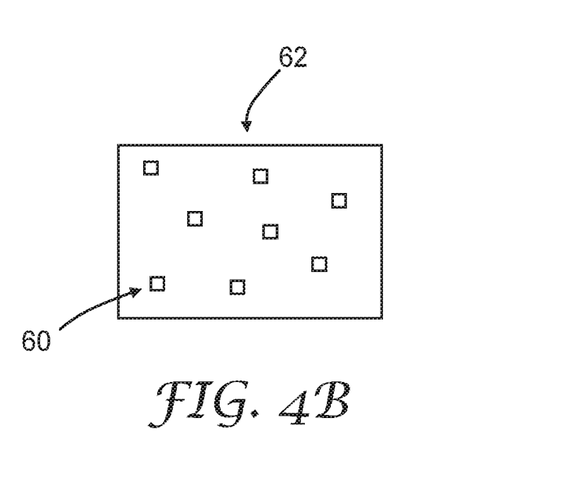

In some embodiments, the optically diffusive film (50) is bonded to the specularly reflective film (40). In some aspects, the optically diffusive film (50) may be bonded to the specularly reflective film (40) at a plurality of discrete spaced apart bonded locations (60) as illustrated in FIG. 1, and more clearly shown in FIGS. 2 and 3. The plurality of discrete spaced apart bonded locations may form a regular array (61), as schematically shown in FIG. 4A, or may form an irregular array (62). When the plurality of discrete spaced apart bonded locations is formed in an irregular array (62), the irregular array of the bonded locations includes substantially randomly arranged bonded locations (60) as best seen in FIG. 4B. As best seen in FIGS. 2 and 3, the specularly reflective film (40), the optically diffusive film (50), and the plurality of discrete spaced apart bonded locations (60) define an air-filled space (70) therebetween.

In some embodiments, best illustrated in FIG. 2, the specularly reflective film (40) may be bonded to the optically diffusive film (50) via an adhesive bump (80) at at least one of the bonded locations (60). For example, acrylic microsphere adhesive (MSA) may be used for the bonding of optically diffusive film (50) with the specular reflective film (40). MSA is usually prepared by conventional suspension polymerization with a monomer composition. Contact area ratio can be controlled by the average size of MSA and coating volume. In some instances, as shown in FIGS. 3 and 4A-4B, the bonding locations (60) form a bonding pattern of a plurality of spaced apart bonding areas (Ab). The bonding pattern in some embodiments may be a regular pattern, and in other embodiments may be an irregular pattern. Each bonding location (60) defines a bonded area (Ab) of a major surface (41) of the specularly reflective film (40). A ratio of a total bonding area to a total area of the major surface (41) may be less than about 20%, or less than 10% in other embodiments.

Example 1

Preparation of Fibers

To obtain non-woven fibers (91), a combination of Tepyrus TA04PN (manufactured by Teijin), having a diameter of about 3 microns, and Tepyrus TJ04CN (manufactured by Teijin), having a diameter of 12 microns were mixed together as fiber ingredient. For instance, 70 wt % Tepyrus TA04PN and 30 wt % of Tepyrus TJ04CN may be used as fiber ingredient. Fiber setting and calendering process may be used for making non-woven optically diffusive film (50) having a thickness of about 34 micron with a total transmittance of about 64%.

Preparation of Acrylic Microsphere Adhesive (MSA)

2895.86 g of de-ionized water and 39.38 g of the surfactant LATEMUL E-118B (manufactured by Kao Corporation) were mixed in a baffle flask attached to a condenser and a thermometer. 1480.50 g of 2-Ethylhexyl Acrylate (2EHA) (manufactured by Nippon shokubai CO., LTD.), 94.50 g of Acrylic Acid (AA) (manufactured by Nippon shokubai CO., LTD.), 0.79 g of 1,4-Butanediol Diacrylate (1,4-BDA) (manufactured by Merck Japan) and 3.15 g of initiator V-65 (manufactured by Wako Pure Chemical) were added to the solution and polymerized at 50 degree-C for 3 hours and 65 degree-C for another 3 hours under N2 purge. Then, 35% of the aqueous suspension of each MSA with the average particle size between 22-50 microns was prepared. The average particle size was controlled by mixing speed during polymerization.

Preparation of Acrylic MSA Coating Solution

Acrylic MSA coating solution having a formulation including MSA suspension, de-ionized water, isopropyl alcohol, 1,3-dioxolane in appropriate ratios was prepared. Each ingredient was input into an ampoule bottle and mixed before coating.

Coating of Acrylic MSA Solution

MSA coating solution was coated onto a 60 micron thick cast polypropylene (CPP) film by knife coating and dried in the oven at 100 degree C. for 5 minutes.

Making of Diffusive Reflector Sample

Acrylic MSA layer formed on the CPP film by coating was transferred to the reflective side of a specularly reflective film (ESR, manufactured by 3M) using a hand roller and then the optically diffusive film having a non-woven layer was laminated to the acrylic MSA layer using a hand roller.

Measurement & Evaluation Method a) Calculation of MSA Contact Area Ratio

After MSA was transferred to the ESR, the photograph of the surface of ESR with MSA was taken using microscope (VK-X100, Keyence Corporation) at extended magnification (10 times). The photograph image file was accessed with graphic software Photoshop 6.0 (Adobe) and the MSA contact area ratio was calculated using the below procedure.

Select ESR without MSA area using "Color range selection" function

See total pixel number of the selected area which is written in histogram

Calculate the MSA contact area ratio using the below formula:

$$\frac{\left(\begin{array}{c}\text{Total pixel number of the whole image} - \\ \text{Pixel number of selected area}\end{array}\right)}{\text{Total pixel number of the whole image}}$$

b) Measurement of Total Transmittance

The total transmittance was measured using an NDH-2000 haze meter (Nippon Denshoku Industries Co., LTD).

c) Measurement of Reflectance

The Specular reflectance (average of 400-800 nm) was measured using a Spectrophotometer UV-3100PC/MPC-3100 (Shimadzu Corporation).

The Total light reflectance (average of 400-800 nm) was measured using a Spectrophotometer U-4100 (Hitachi High Technology).

d) Measurement of Luminance

Sony's Photo Frame DPF-D720 (6.3 inch wide) was used as testbed for in module evaluation. Optical film construction was changed from original state as follows.

| DBEF-Qv2 and BEF4-DML-95(24): manufacture by 3 M |
|---|
| DBEF-Qv2<br>Crossed BEF4-DML x2<br>Original lightguide plate<br>Reflective film sample |

Spectroradiometer CS-1000 (Konica Minolta) was used to measure the center luminance. The center luminance of each diffusive reflective film sample, which is made by lamination with MSA, was compared to that of the sample which is made by lamination with common plane OCA. "Relative luminance" calculated with below formula is used as the index.

$$\text{Relative luminance} = \frac{\text{Luminance of } MSA \text{ lamination sample}}{\text{Lumination of plane } OCA \text{ lamination sample}}$$

Sample which is made by lamination with common plane OCA was prepared using same Nonwoven material, ESR and 7029, 15 micron thick OCA (manufactured by Teraoka Seisakusho, Co., LTD).

The MSA contact area ratio, total light reflectance, specular reflectance, and relative luminance of each sample are listed in below table.

TABLE 1

|  | MSA Contact Area Ratio (%) | Total Light Reflectance (%) | Specular Reflectance (%) | Relative Luminance |
|---|---|---|---|---|
| Sample 1 | 7.66 | >99.5 | 5.80 | 1.0052 |
| Sample 2 | 4.74 | >99.5 | 5.76 | 1.0071 |
| Sample 3 | 4.01 | >99.5 | 5.70 | 1.0051 |
| Sample 4 | 6.41 | >99.5 | 5.67 | 1.0060 |
| Sample 5 | 8.52 | >99.5 | 5.83 | 1.0133 |
| Sample 6 | 7.89 | >99.5 | 5.62 | 1.0091 |
| Sample 7 | 4.00 | >99.5 | 5.67 | 1.0217 |
| Comparison 1 | 45.28 | >99.5 | 5.74 | 0.9894 |
| Comparison 2 | 20.06 | >99.5 | 5368 | 0.9936 |
| Comparison 3 | 23.21 | >99.5 | 5.66 | 0.9959 |

It was observed that diffusive reflective film assembly including a MOF based specular reflective film and properly designed optically diffusive film including a non-woven layer shows high diffuse reflection performance with high luminance when both components are laminated with acrylic microsphere adhesive (MSA) and the contact area ratio between MOF based specular reflective film and MSA is less than 20%, less than 10% being more desirable.

In some other embodiments, the specularly reflective film (40) is bonded to the optically diffusive film (50) via locally applied heat and pressure lamination at at least one (81) of the bonded locations. In some instances, as shown in FIGS. 3 and 4A-4B, the bonding locations (60) form a bonding pattern of a plurality of spaced apart bonding areas (Ab). Each bonded location (60) defines a bonded area (Ab) of a major surface (41) of the specularly reflective film (40). In some instances, the total bonding area (Ab) may be less than about 10%, or less than about 5%, or less than about 4%.

Example 2

Preparation of Fibers

To obtain non-woven fibers, a combination of Tepyrus TA04PN (manufactured by Teijin), having a diameter of about 3 microns, and Tepyrus TJ04CN (manufactured by Teijin), having a diameter of 12 microns were mixed together as fiber ingredient. For instance, 70 wt % Tepyrus TA04PN and 30 wt % of Tepyrus TJ04CN may be used as fiber ingredient. Fiber setting and calendering process may be used for making non-woven optically diffusive film (50) having a thickness of about 34 micron with a total transmittance of about 64%.

Spot Heat Lamination with Structured Tool

Structured tools may be used for spot discontinuous heat and pressure lamination to obtain the desired bonding. The structured tools may be a pyramidal shape tool or a trapezoidal prism shape tool, or a combination of both. The structured area of the structured tool is 120 mm×120 mm and the size of the non-woven layer is 150 mm×150 mm. Both upper and lower stages were heated at same temperature. The specularly reflective film and the non-woven optically diffusive layer were not pre-heated. The optically diffusive film having non-woven fibers and the specularly reflective film (ESR, manufactured by 3M) were stacked and pressed with heat using the structured tool at a temperature of about 120-150 degrees and a pressure of about 10-50 KN.

Measurement & Evaluation Method a. Calculation of Contact Area Ratio

The nonwoven material was heat laminated to 50 micron thick PET film (E4100, TOYOBO CO., LTD.) instead of ESR, using structured tool. After the heat lamination, the photograph of the surface of PET film was taken using microscope (VK-X100, Keyence Corporation) at extended magnification (10 times). Only the portion of core-sheath fiber could adhere to the PET film and this area looked darker grey color than the other area when the laminated sample was seen from PET film side.

Then the photograph image file was accessed using graphic software Photoshop 6.0 (Adobe) and contact area ratio was calculated using the below procedure.

Select contact area (dark gray area) using "Color range selection" function

See total pixel number of the selected area which is written in histogram

Calculate Contact area ratio using below formula $$\text{Contact area ratio} = \frac{\text{Total pixel number of the selected area}}{\text{Total pixel number of the whole image}}$$

b) Measurement of Total Transmittance

The total transmittance was measured using an NDH-2000 haze meter (Nippon Denshoku Industries Co., LTD).

c) Measurement of Reflectance

The Specular reflectance (average of 400-800 nm) was measured using a Spectrophotometer UV-3100PC/MPC-3100 (Shimadzu Corporation).

The Total light reflectance (average of 400-800 nm) was measured using a Spectrophotometer U-4100 (Hitachi High Technology).

d) Measurement of Luminance

Sony's Photo Frame DPF-D720 (6.3 inch wide) was used as testbed for in module evaluation. Optical film construction was changed from original state as follows.

| DBEF-Qv2 and BEF4-DML-95(24): manufacture by 3 M |
|---|
| DBEF-Qv2 |
| Crossed BEF4-DML x2 |
| Original lightguide plate |
| Reflective film sample |

Spectroradiometer CS-1000 (Konica Minolta) was used to measure the center luminance. Spot heat laminated sample was too small to assemble to the testbed. Therefore, 2 sample pieces were connected using ESR with adhesive tape. The ESR with adhesive tape was applied to the backside of the reflective film.

The center luminance of each diffusive reflective film sample which is made by spot heat lamination with structured tool is compared to that of the sample which is made by heat lamination with plane tool. "Relative luminance" calculated using below formula is used as the index.

$$\text{Relative luminance} = \frac{\text{Luminance of spot heat laminated sample}}{\text{Luminance of laminated sample with plane tool}}$$

The contact area ratio, total light reflectance, specular reflectance, and relative luminance of each sample are listed in below table.

TABLE 2

| | MSA Contact Area Ratio (%) | Total Light Reflectance (%) | Specular Reflectance (%) | Relative Luminance |
|---|---|---|---|---|
| Sample 1 | 2.45 | >99.5 | 5.78 | 1.0086 |
| Sample 2 | 3.59 | >99.5 | 5.58 | 1.0117 |
| Sample 3 | 4.03 | >99.5 | 5.64 | 1.0064 |
| Sample 4 | 4.50 | >99.5 | 5.59 | 1.0071 |
| Sample 5 | 3.32 | >99.5 | 5.65 | 1.0177 |
| Sample 6 | 4.66 | >99.5 | 5.75 | 1.0142 |
| Comparison | 7.92 | >99.5 | 5.58 | 0.9952 |

It was observed that diffusive reflective film assembly including a multiple optical film (MOF) based specular reflective film and properly designed optically diffusive film including a non-woven layer shows high diffuse reflection performance with high luminance when the non-woven material contains core-sheath fiber more than 10%, and both components are laminated by spot (discontinuous) heat lamination with structured tool, and the contact area ratio between the non-woven material and the MOF based specular reflective film is less than 5%.

The invention claimed is:

1. A backlight for providing illumination to a liquid crystal panel, comprising:
a reflective polarizer, such that for a substantially normally incident light and for at least one visible wavelength in a range extending from about 400 nm to about 800 nm, the reflective polarizer reflects at least 60% of the incident light having a first polarization state and transmits at least 60% of the incident light having an orthogonal second polarization state; and
an extended light source comprising:
a diffuse reflective film assembly; and
an emission surface disposed between the reflective polarizer and the diffuse reflective film assembly, the extended light source configured to emit light through the emission surface toward the reflective polarizer, wherein the diffuse reflective film assembly comprises:
a specularly reflective film, such that for a substantially normally incident light and for the at least one visible wavelength, the reflective film specularly reflects at least 80% of the incident light for each of the first and second polarization states; and
an optically diffusive film disposed between the emission surface and the specularly reflective film and bonded to the specularly reflective film at a plurality of discrete spaced apart bonded locations, wherein the optically diffusive film comprises a plurality of fibers, and wherein at least 20% of the fibers have an average diameter less than about 5 microns, and at least 50% of the fibers have an average diameter greater than about 8 microns.

2. The backlight of claim 1, wherein the diffuse reflective film assembly and the emission surface are substantially aligned and co-extensive with each other, and wherein the specularly reflective film has an average specular reflectance of greater than about 99% in a visible range extending from about 450 nm to about 650 nm.

3. The backlight of claim 1, wherein the specularly reflective film and the optically diffusive film are substantially aligned and co-extensive with each other, and wherein the plurality of discrete spaced apart bonded locations form a regular array.

4. The backlight of claim 1, wherein at at least one of the bonded locations, the specularly reflective film is bonded to the optically diffusive film via locally applied heat and pressure lamination, wherein the optically diffusive film comprises a non-woven layer comprising the plurality of fibers dispersed in a material, wherein the fibers have an average diameter less than about 10 microns, wherein a ratio of a total weight of the fibers to a total weight of the non-woven layer is greater than about 50%.

5. The backlight of claim 1, wherein the extended light source comprises:
a lightguide for propagating light therein along a length and a width of the lightguide, the lightguide comprising the emission surface and disposed between the emission surface and the diffuse reflective film assembly; and
at least one light source disposed proximate an edge surface of the lightguide.

6. The backlight of claim 1, wherein the extended light source comprises:
the emission surface and the diffuse reflective film assembly, wherein the emission surface and the diffuse reflective film assembly define an optical cavity therebetween; and
at least one light source disposed in the optical cavity.

7. The backlight of claim 1, wherein the at least one visible wavelength comprises each visible wavelength in a range from about 400 nm to about 800 nm, wherein the backlight further comprises one or more prismatic layers disposed between the reflective polarizer and the emission surface, the one or more prismatic layers comprising a plurality of prismatic structures, and wherein the reflective polarizer, the emission surface of the extended light source, and the one or more prismatic layers are substantially co-extensive with each other.

8. The backlight of claim 1, wherein each bonded location defines a bonded area of a major surface of the specularly reflective film, and wherein a ratio of a total bonding area to a total area of the major surface is less than about 20%, wherein the specularly reflective film comprises a plurality of polymeric layers numbering more than about 50 in total, and wherein the backlight further comprises an optically diffusive layer disposed between the extended light source and the reflective polarizer for diffusing light emitted by the extended light source.

9. An optically diffuse reflective film assembly, comprising:
a specularly reflective film, such that for a substantially normally incident light and for at least one visible wavelength in a wavelength range extending from about 400 nm to about 800 nm, the reflective film specularly reflects at least 95% of the incident light for each of orthogonal first and second polarization states; and
an optically diffusive film bonded to the specularly reflective film in a bonding pattern of a plurality of spaced apart bonding areas with a total bonding area of less than about 20%, wherein the optically diffusive film comprises a plurality of fibers, wherein at least 20% of the fibers have an average diameter less than about 5 microns, and at least 50% of the fibers have an average diameter greater than about 8 microns.

10. The optically diffuse reflective film assembly of claim 9, wherein the bonding pattern is a regular pattern, or an irregular pattern, wherein a ratio of a total weight of the fibers to a total weight of the optically diffusive film is greater than about 80%, wherein the plurality of fibers in the optically diffusive film is dispersed in a material, wherein the total bonding area is less than about 10%, and wherein the fibers have an average diameter less than about 8 microns.

11. The backlight of claim 1, wherein the plurality of discrete spaced apart bonded locations form an irregular array.

12. The backlight of claim 11, wherein the irregular array of the bonded locations comprises substantially randomly arranged bonded locations.

13. The backlight of claim 1, wherein the specularly reflective film, the optically diffusive film, and the plurality of discrete spaced apart bonded locations define an air-filled space therebetween.

14. The backlight of claim 1, wherein at at least one of the bonded locations, the specularly reflective film is bonded to the optically diffusive film via an adhesive bump.

15. The backlight of claim 1, wherein the optically diffusive film comprises a non-woven layer comprising a plurality of fibers dispersed in a material.

16. The backlight of claim 1, wherein the optically diffusive film comprises a non-woven layer comprising a plurality of fibers.

17. The backlight of claim 16, wherein a ratio of a total weight of the fibers to a total weight of the non-woven layer is greater than about 95%.

18. The backlight of claim 1, wherein for the substantially normally incident light and for the at least one visible wavelength, the reflective film specularly reflects at least 90% of the incident for each of the first and second polarization states.

19. The backlight of claim 1, wherein for a substantially normally incident light and for the at least one visible wavelength, the diffuse reflective film assembly has a total reflectance greater than about 90% and a specular reflectance of less than about 50% for each of the first and second polarization states.

20. The optically diffuse reflective film assembly of claim 9, wherein a ratio of a total weight of the fibers to a total weight of the optically diffusive film is greater than about 90%.

* * * * *